US008127666B2

(12) United States Patent
Yip

(10) Patent No.: US 8,127,666 B2
(45) Date of Patent: Mar. 6, 2012

(54) TOASTER WITH MECHANISM FOR RAISING CARRIAGE ABOVE AN EJECTION POSITION

(75) Inventor: Thomas Chung Lik Yip, Kwun Tong (HK)

(73) Assignee: G.E.W. Corporation Limited, Kwun Tong (HK)

( * ) Notice: Subject to any disclaimer, the term of this patent is extended or adjusted under 35 U.S.C. 154(b) by 415 days.

(21) Appl. No.: 12/465,814

(22) Filed: May 24, 2009

(65) Prior Publication Data

US 2010/0294136 A1 Nov. 25, 2010

(51) Int. Cl.
*A47J 37/08* (2006.01)

(52) U.S. Cl. .................... 99/329 RT; 99/329 P; 99/391; 99/393

(58) Field of Classification Search .............. 99/329 RT, 99/329 P, 391, 393
See application file for complete search history.

(56) References Cited

U.S. PATENT DOCUMENTS 4,345,513 A * 8/1982 Holt ................................ 99/327
5,072,662 A 12/1991 Yip
5,901,638 A * 5/1999 Houel ............................. 99/327
7,036,424 B2 * 5/2006 Friel, Sr. ......................... 99/327

* cited by examiner

*Primary Examiner* — Reginald L Alexander
(74) *Attorney, Agent, or Firm* — Leydig, Voit & Mayer, Ltd.

(57) ABSTRACT

An electric toaster with a toasting carriage which is automatically raised from a toasting position to a first ejection position has a manually-operated mechanism for raising the carriage above the first ejection position to assist in removing smaller items from the toasting carnage. The carriage is slidably supported on an upright rail together with, and moveable independently of an actuating member, to which a handle is fixed, and a support member urged by a spring to an uppermost position. The actuating member abuts the carriage to move the carriage, the actuating member, and the support member simultaneously, both when the handle is moved downwards towards the toasting position and when the carriage, the actuating member and the support member are released by a hold-down mechanism to return the carriage to the first ejection position. A displacement-amplifying mechanism mounted on the support member abuts the carriage and the actuating member such that upward movement of the actuating member provides a greater movement of the carriage upward from the first ejection position.

8 Claims, 6 Drawing Sheets

TOASTER WITH MECHANISM FOR RAISING CARRIAGE ABOVE AN EJECTION POSITION

TECHNICAL FIELD

The present invention relates to an electric toaster having a toasting carriage which is automatically raised from a toasting position to a first ejection position and having a manually-operated mechanism for raising the carriage above the first ejection position so as to assist in removing smaller items from the toasting carriage.

BACKGROUND OF THE INVENTION

So-called "pop-up" toasters incorporate a toasting chamber with a toasting carriage moveable between an upper position and a lower position against a biasing spring for a toasting cycle. A handle is provided for moving the carriage to the lower position. At the same time as being moved to the lower position the toasting carriage makes switch contacts for energising toaster elements and to begin the toasting cycle. An electric solenoid catch holds the toasting carriage in the lower position for the period of the toasting cycle. At the end of the toasting cycle the toasting carriage is automatically released and the spring raises the toasting carriage to a first ejection position to "pop-up" the toasted item.

The applicant's U.S. Pat. No. 5,072,662 describes a toaster of this type which addresses the problem of allowing smaller toasted items to be more easily removed from the toaster. The handle serves not only for lowering the carriage, but it may also be actuated to raise the carriage above the first ejection position, thereby allowing smaller items to be extended further from the toasting chamber, thus allowing them to be more readily removed. It will be understood that there remains a need for an improved toaster of this general type and particularly one providing a carriage-raising mechanism which is easier to use.

One of the problems with prior art toasters of this type is that, because a part of the carriage abuts the switch for operating the toaster elements, at the end of the cycle upward movement of the carriage is necessary before the switch is once again opened, to cut power to the elements. If the carriage is jammed, as by an item to be toasted, when in a position in which the switch remains closed then this can result in the item being burnt or, more seriously, a fire. There is, therefore, a need for a toaster which prevents power supply being maintained to the elements after the solenoid catch has been released, in the case where the carriage is jammed at or near its toasting position. It is an object of the present invention to address these needs or more generally to provide an improved electric toaster.

DISCLOSURE OF THE INVENTION

According to one aspect of the present invention there is provided an electric toaster comprising:

a housing with an elongate top opening for insertion of an item to be toasted;

an upright slot in the housing;

an upright rail in the housing;

a carriage in the housing for supporting an item to be toasted, the carriage being engaged with the rail for movement along the rail between a lowermost toasting position, a first ejection position and a second ejection position higher than said first ejection position;

a support member engaged with the rail for movement between respective upper and lower positions;

an actuating member engaged with the rail and movable relative to the support member and to the carriage, the actuating member having an operating arm extending through the upright slot;

a displacement-amplifying mechanism mounted to the support member for operatively connecting the actuating member and carriage;

a latching member for cooperating with a hold-down latch, and first resilient means for urging the carriage to its first ejection position, in which the carriage, support member and actuating member abut one another to simultaneously when the operating arm is moved downwards towards the toasting position to cause the latching member to engage the hold-down latch, and abut one another when the hold-down latch is released and the carriage is moved upwards by the first resilient means to its first ejection position, and in which, with the carriage in its first ejection position, movement of the actuating member upwardly relative to the support member is amplified by the displacement-amplifying mechanism to move the carriage from the first ejection position to the second ejection position.

Preferably the displacement-amplifying mechanism comprises a lever mounted by a pivot to the support member, the lever having first and second abutment faces spaced radially from the pivot at first and second distances respectively, wherein the first distance is exceeds the second distance, the carriage having a first abutment; the actuating member having a second abutment; in which, with the carriage in its first ejection position, movement of the actuating member upwardly relative to the support member engages the first and second abutment faces with the first and second abutments respectively so as to raise the carriage to the second ejection position. It is contemplated that many other types of displacement-amplifying mechanism may also be used for amplifying the upward displacement of the actuating member relative to the support member and transmitting it to the carriage. In one non-limiting example, a cam-follower mechanism may be used comprising a pinion rotationally fast with a cam, a rack engaged with the pinion and fixed to the actuating member, with a cam follower or follower surface fixed to the carriage. A gear-type displacement-amplifying mechanism may be used, for instance including small and large diameter rotationally fast gears, a first rack engaged with the small gear and fixed to the actuating member, and a second rack engaged with the large gear and fixed to the carriage.

Preferably the toaster further includes: heating elements and a normally-open switch electrically connected to the heating elements, the switch being operable by engagement with the actuating member or the support member to close the switch, and wherein with the actuating member and support member lowered to an intermediate position in which the carriage reaches its lowermost toasting position the switch is open and further downward movement of the actuating member below it intermediate position is necessary to close the switch.

Preferably the lever is bifurcate having first and second legs on which the first and second abutment faces are disposed, the legs being fixed to a hub portion for receiving the pivot. Preferably the axis of the pivot extends substantially perpendicular to an axis of the rail.

Preferably the support member and actuating member each have respective upper and lower flanges joined by a web, the rail being received in aligned apertures in the flanges, the upper and lower flanges of the actuating member being located between the upper and lower flanges of the support member and the carriage including a bracket portion having an opening in which the rail is received, the bracket portion being located between the upper and lower flanges of the actuating member.

Preferably the web of the support member includes an aperture through which the operating arm extends.

Preferably the first resilient means comprising a first tension spring and the electric toaster further comprises a chassis to which the rail is mounted, and a second tension spring connected between the lower flange of the support member and the upper flange of the actuating member and wherein the first tension spring is connected between the chassis and the lower flange of the support member.

This invention provides an electric toaster which is effective and efficient in operational use, which has an overall simple design which minimizes manufacturing costs and which easier to use than the old toasters for removing smaller toasted items, since a small upward movement of the operating arm impels a relatively large upward movement of the carriage.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
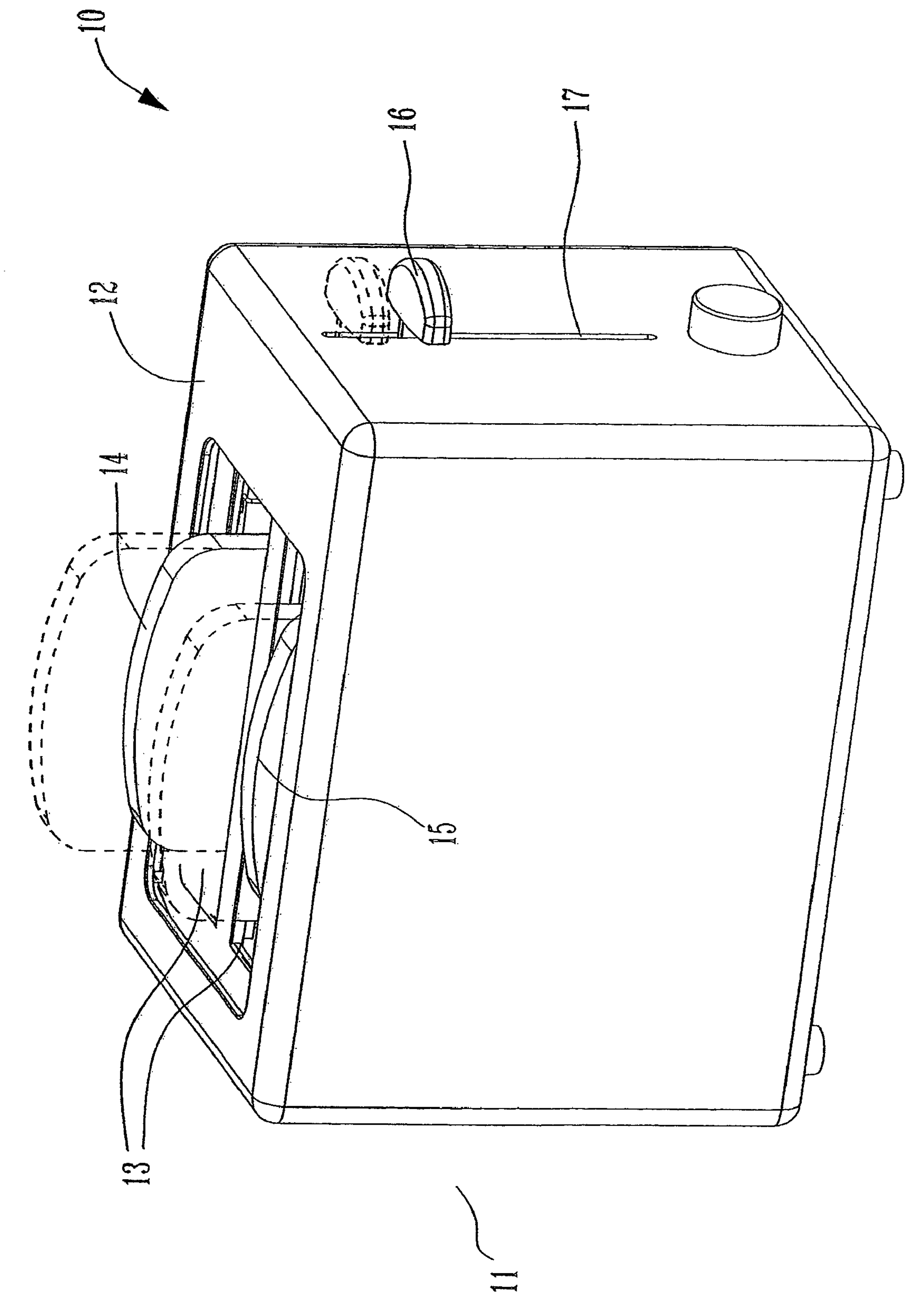
FIG. 1 is a perspective view of a preferred embodiment of the toaster of the invention.

Referring to FIG. 1, a toaster 10 according to a preferred embodiment of the invention comprises a closed or generally-closed housing 11 having a top side 12 in which a pair of elongate openings 13 are provided for receiving of slices of bread 14, 15 or other items to be toasted. A handle 16 on an end 17 of the housing 2 is mounted on the end of an operating arm (not shown in FIG. 1) extending through the upright slot 17 in the housing. The handle 16 is provided for lowering and raising a carriage (not shown in FIG. 1) in which the bread 14, 15 is carried.

FIG. 1 shows the toaster 10 with the handle 16 in a first upper position. To toast bread slices 14, 15, the bread is inserted through the openings 13 to rest on the carriage and the handle 16 is depressed to move the carriage to a lower, toasting position where it is held in position by a hold-down latch (not shown) and electrical heating elements (not shown) are energised to toast the bread. When toasting is complete the latch automatically releases the carriage, the power to the heating elements is cut and the carriage returns under the action of a spring to the position of FIG. 1. In this position, a first ejection position, the larger slice of bread 14 can be easily retrieved, but the smaller slice 15 does not project above the top side 12. To retrieve the smaller slice 15, the handle 16 is manually lifted, to the position shown in dashed outline, to raise the carriage to a second, upper ejection position closer to the top side 12, whereupon the slice 15, shown in dashed outline in the upper ejection position, can be easily retrieved.

Figure 2:
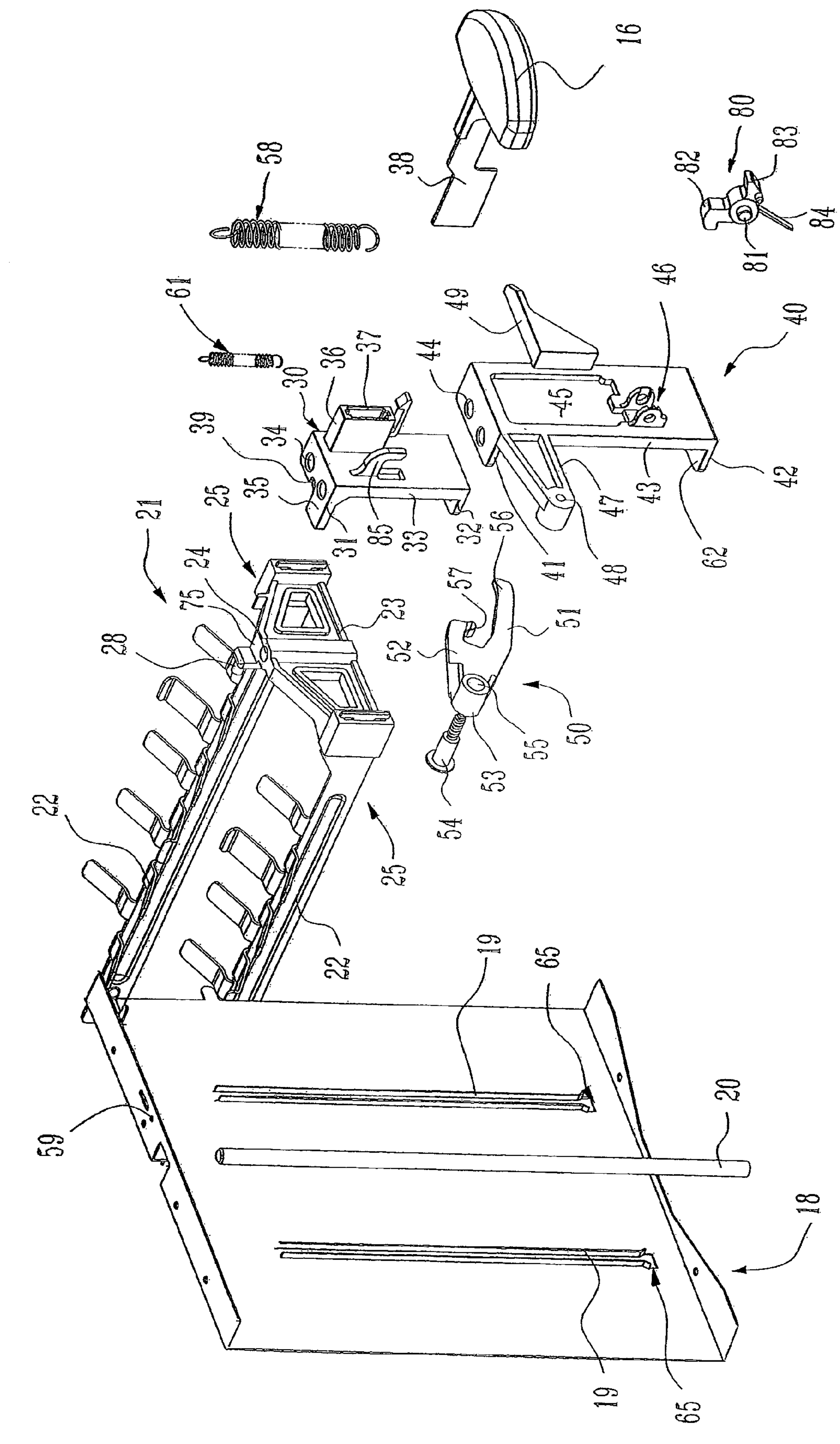
FIG. 2 is an exploded pictorial view of the mechanism for raising and lowering a toasting carriage of the toaster of FIG. 1.
Figure 3B:
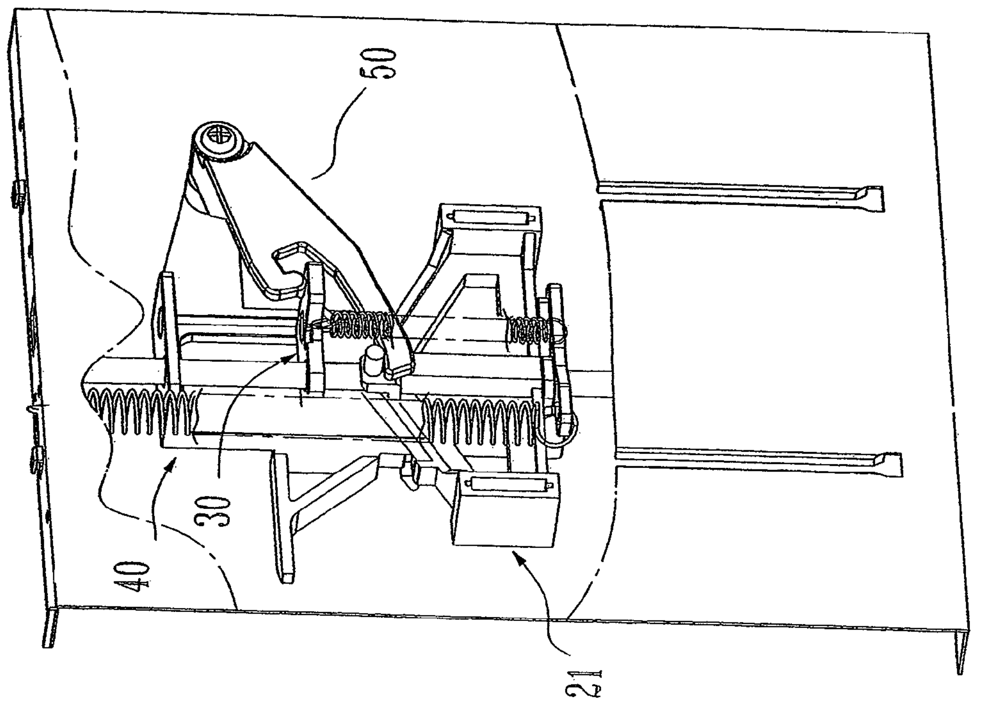
FIGS. 3*a* and 3*b* are pictorial view from opposing sides of the mechanism of FIG. 2 assembled.
Figure 3A:
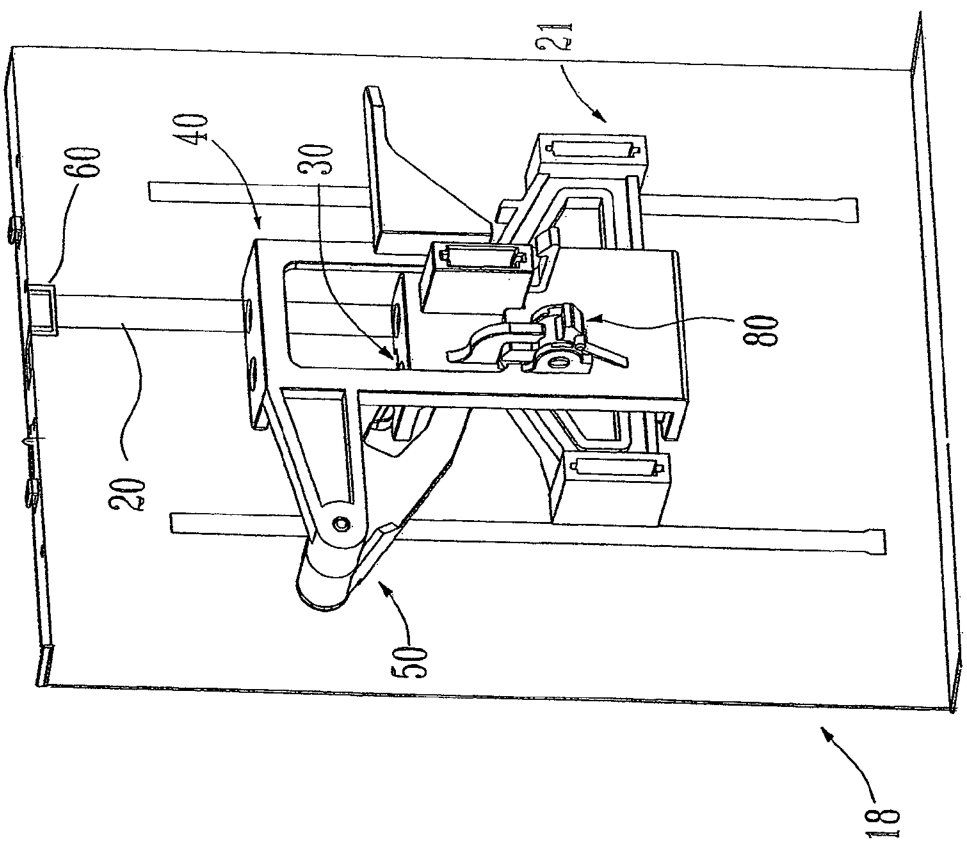

As shown in FIGS. 2, 3*a* and 3*b*, mounted within the housing 11 the toaster 10 has a chassis including a pressed metal end plate 18 of generally rectangular form with parallel slots 19 formed therein. The slots 19 terminate at their lower ends in end faces 65. The end plate 18 bounds one side of the toasting chamber (not shown). A straight rail 20 has a cylindrical form and is fixed upright inside the housing parallel to the slots 19 and the slot 17.

A carriage 21 includes elongate racks 22 and a cross member 23. The cross member 23 has an upper face 75. The two racks support the bread slices 14, 15 and are fixed at one end to the cross member 23. An opening 24 through the cross member 23 lies in an upright central plane bisecting the carriage 21 receives the rail 20 for guiding the carriage vertically. The racks 22 are thus supported in a cantilever manner with their outer ends 25 reciprocating within the slots 19. Also having its axis aligned in the upright central plane is a first abutment 28 having a generally cylindrical surface and fixed on the cross member 23, projecting from the inner side the cross member 23 in the direction of the racks 22.

An actuating member 30 includes upper and lower parallel flanges 31, 32 joined by a web 33 to form a channel shape. Aligned apertures 34 in the flanges 31, 32 receive the rail 20. The cross member 23 of the carriage 21 is received between the flanges 31, 32, which are spaced apart to allow relative movement between the actuating member 30 and the carriage 21. A second abutment 35 is formed on the upper flange 31. A socket portion 36 integral with the web 33 includes an opening 37. An operating arm 38 has the handle 16 fixed at one end thereof and its opposing end is received in the opening 37 to fix the handle 16 to the actuating member. The operating arm 38 extends through the vertical slot 17 in the housing. A hole 39 is provided in the top flange 31.

A support member 40 includes upper and lower parallel flanges 41, 42 joined by a web 43 to form a channel shape. Aligned apertures 44 in the flanges 41, 42 receive the rail 20. An opening 45 is formed in the web 43 through which the socket 36 projects, with the actuating member flanges 31, 32 received between the support member flanges 41, 42, which are spaced apart to allow relative movement between the actuating member 30 and the support member 40. A pair of flanges 46 are provided on the support member 40 for holding a latching member 80 that cooperates with a hold-down latch (not shown) such as a solenoid-operated hold-down latch for holding the support member 40 in its lower position. The web 43 is substantially rectangular with a tab 47 projecting from one long edge and a switch-operating arm 49 projecting from the opposite edge. The tab 47 is coplanar with the web 43 and has an aperture 48 therein.

The latching member 80 is pivotable, having aligned axle parts 81 received in apertures in the flanges 46. The body of the latching member 80 includes first and second faces 82, 83 which are generally perpendicular and a unitary resilient leg 84. When assembled a locking arm 85 integral with the actuating member 30 abuts the first face 82. The resilient leg 84 bears against the web 43, tending to hold the second face 83 horizontal, when the hold-down arm 85 is raised and thereby disengaged. The second face 83 abuts a solenoid-operated hold-down latch (not shown) and the mechanism allows the handle to be used to raise the carriage 21, even while the solenoid-operated hold-down latch remains in its latched state.

A displacement-amplifying mechanism in the form of a lever 50 is bifurcate having first and second legs 51, 52 with inner ends integral with a hub portion 53 and extending at an acute angle. A pivot 54 extends through an opening 55 through the hub portion 53 and through aperture 48, thereby mounting the lever 50 to the support member 40 for pivoting about an axis substantially perpendicular to the rail 20. The first leg 51 has a first abutment face 56 at an outer end thereof. The second leg 52 has a arcuate second abutment face 57 at its outer end, the second abutment face 57 being located radially inwardly of the first abutment face 56.

A first helical tension spring 58 has one end fixed in the aperture 59 in the end plate 18 and the opposing end fixed in aperture 60 on the lower flange 42 of the support member 40. The first helical tension spring 58 therefore urges the support member 40 upwardly, urging the upper flange 41 to abut a stop (not shown). A second helical tension spring 61 has one end fixed in the aperture 39 in the actuating member 30 and the opposing end fixed in aperture 62 in the lower flange 42 of the support member 40. In this manner the second helical tension spring 61 urges the actuating member 30 downwardly, urging the lower flanges 42, 32 into mutual contact.

Figures 4, 5:
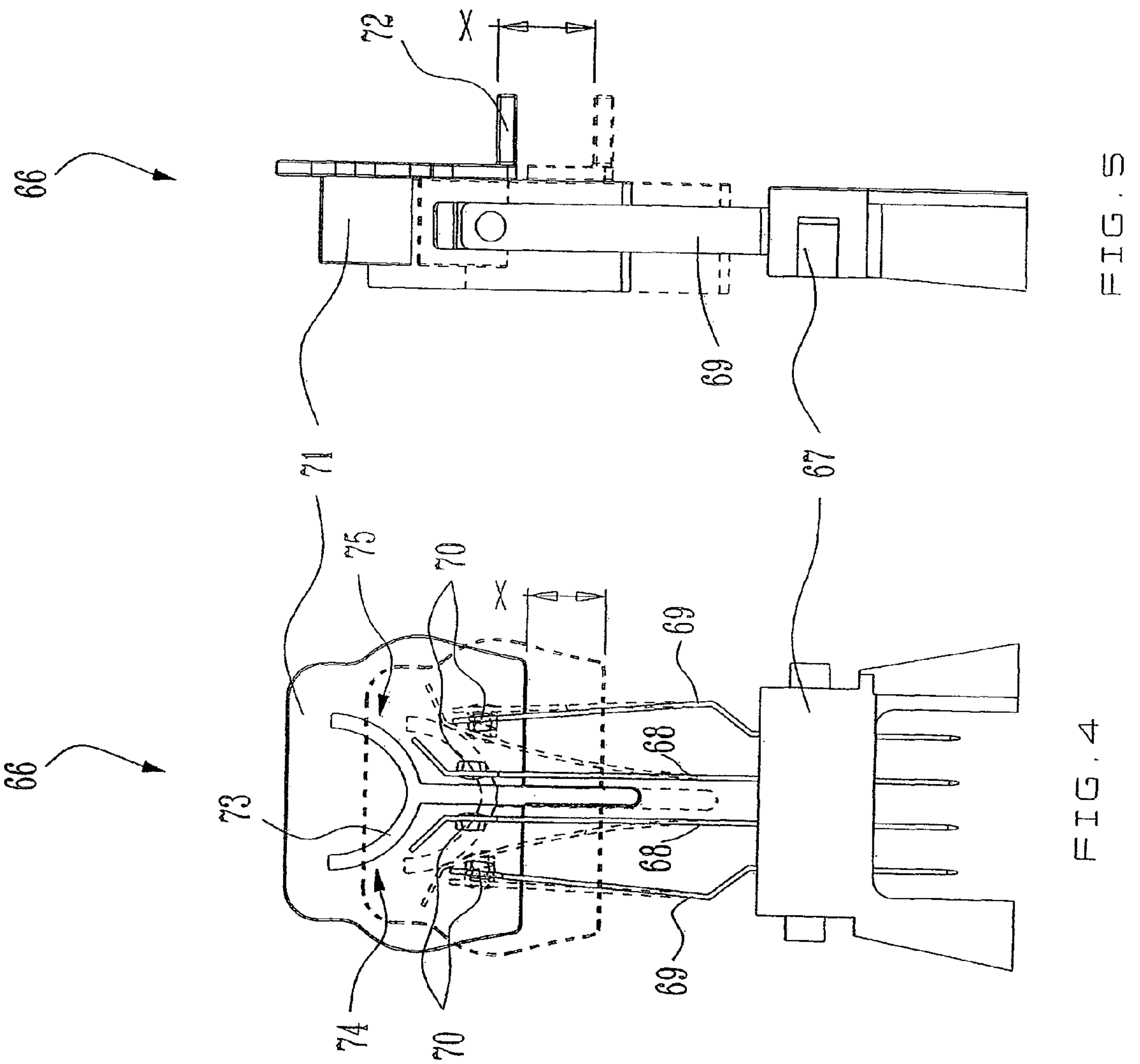
FIGS. 4 and 5 are schematic front and side views of a switch of the toaster for controlling the elements.

A normally-open electrical switch 66 for controlling power to the heating elements is mounted within the housing 11 in the upright orientation shown in FIGS. 4 and 5 for operation by the switch-operating arm 49. The switch 66 includes a block 67 mounted as to the chassis or base of the toaster. Two pairs of elongate, resilient conductors 68, 69 mounted in the block 67 in a cantilevered manner have respective contacts 70 fixed at their upper ends. Slidably mounted to a body part (not shown) is a reciprocating head 71 moulded of dielectric material and having an outwardly projecting tab 72. The head 71 further includes a generally upright Y-shaped projection 73 which is disposed between the two pairs of conductor arms 68, 69. The projection 73 includes opposing faces 74, 75 inclined relative to an upright axis for abutting the inner arms 68. Before operating the toaster the switch 66 is open, the contacts 70 spaced apart, the resilient action of the arms 68 urging the reciprocating head 71 to the position shown in FIGS. 4 and 5. When the handle 16 is lowered sufficiently the switch-operating arm 49 abuts the tab 72, displacing the head 71 downward by dimension X, to the position shown in dashed outline, in which position the inclined faces 74, 75 abut and deflect the arms 68 to bring the contacts 70 together, thereby closing the switch and supplying power to the heating elements. When the switch-operating arm 49 is raised the switch returns to its open circuit state.

The operation of the mechanism is best understood with reference to FIGS. 6 to 9. Prior to use (as show in FIG. 6), the support member 40 is held in its upper position by spring 58 with the flange 41 abutting the stop 60. The actuating member 30 is held in contact with the support member 40 by the spring 61, the lower flanges 42, 32 being in mutual contact. The carriage 21 is held at a first ejection position (FIG. 6) where its weight is supported by the actuating member 30, the cross member 23 of the carriage 21 being supported upon the flange 32 of the actuating member 30. In this position the vertical dimension x is the space between the bottom of flange 31 and the top of cross member 23. The lever 50 is supported with its second abutment face 57 engaging second abutment 35.

Figure 9:
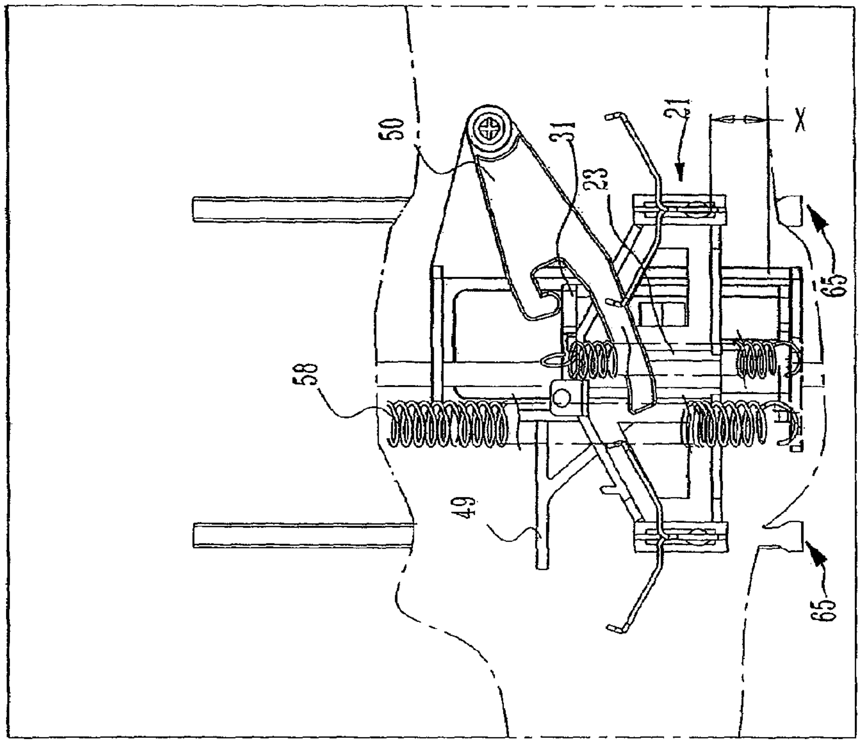
FIG. 9 is a partially cut away elevation of the mechanism in a toasting position.
Figure 8:
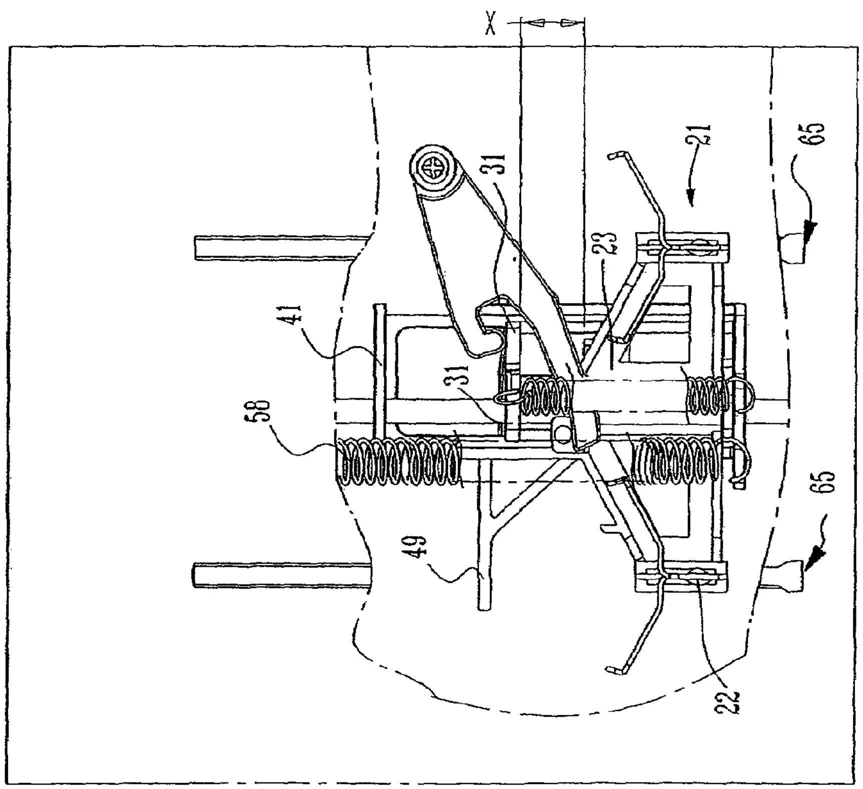
FIG. 8 is a partially cut away elevation of the mechanism with the carriage in its lowest position.

After inserting the bread, the user then moves the actuating member 30 (via the handle 16) downward past an intermediate position (shown in FIG. 8) to its lowest position (shown in FIG. 9). Downward movement of the actuating member 30 simultaneously moves the carriage 21 and the support member 40 downwards towards the toasting position. The carriage 21 drops freely with the actuating member 30 until the carriage 21 comes to its lowermost toasting position in which the racks 23 reach the end of the slots 19 and abut the end faces 65, as shown in FIG. 8. With the carriage 21 in its lowest position and the cross member 23 supported upon the flange 32, the switch-operating arm 49 abuts the tab 72. Further downward movement of the actuating member 30 below the intermediate position of FIG. 8 displaces the mutually abutting support member 40 and the actuating member 30 downward together by dimension x, which is limited by the flange 31 abutting the top face 75 of the cross member 23. With the support member 40 and the actuating member 30 in their lowest positions, as shown in FIG. 9, the latching member 46 is engaged by the solenoid-operated hold-down latch (not shown) and as dimension x is sufficient displacement to operate the switch 66 the toasting cycle commences.

If, during the toasting cycle, the user raises the handle 16 manually, the latching member 80 allows the carriage 21 to be released and raised, while the solenoid-operated hold-down latch remains in its latched position. The initial upward movement of the handle 16 and attached actuating member 30 disengages the locking arm 85 from the face 82, then further upward movement pivots the latching member 80, against the action of the resilient arm 84. In this way face 83 is pivoted and disengaged from the hold-down latch, allowing the actuating member 30, support member 40 and carriage 21 to move upward together until the stop 60 is reached.

When released by de-energising the solenoid of the hold-down latch at the end of the toasting cycle, the support member 40 and actuating member 30 are urged upward under the action of spring 58. Upward movement of the support member 40 and actuating member 30 by the distance x is sufficient to open the switch 66, before any upward movement of the carriage 21 occurs. Thus, even if the carriage 21 remains jammed in its lowermost toasting position the switch opens to cut power to the heating elements. This safety feature avoids the fire danger which could otherwise arise in the instance where the carriage 21 became jammed at its lowest position with the bread held next to the elements and the switch closed.

Following this initial upward movement of the actuating member 30 and support member 40, the lower flange 32 of the actuating member 30 (held in abutment with the lower flange 42 of the support member 40 by spring 61) abuts the cross member 23 of the carriage 21, thereby moving the actuating member 30, support member 40 and carriage 21 upward together until the stop 60 is reached. With the carriage now in its first ejection position (as shown in FIG. 6), the larger slice of toast 14, can be readily removed as it projects substantially above the face 12, however the smaller slice 15 cannot be readily grasped. moving the carriage to its first ejection position.

Figure 7:
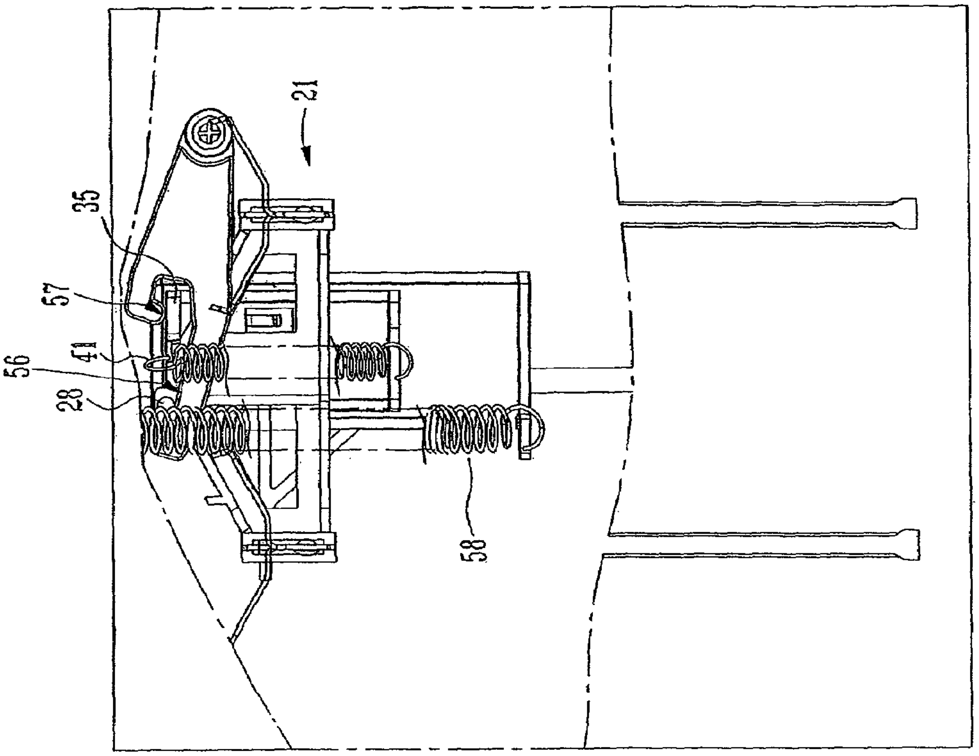
FIG. 7 is a partially cut away elevation of the mechanism with the carriage in a second ejection position.

To retrieve the smaller slice 15, the handle 16 is manually lifted to its uppermost position (shown in dashed outline in FIG. 1), actuating the displacement-amplifying mechanism to raise the carriage to a second, upper ejection position closer to the top side 12. Movement of the actuating member 30 upwardly relative to the carriage 21 (as shown in FIG. 7) rotates the lever 50 due to the second abutment face 57 engaging second abutment 35, thereby bringing the first abutment face 56 to engage the first abutment 28. Due to the radial offset between the first and second abutment faces 56, 57 a relatively small vertical movement of the actuating member 30 produces a relatively larger vertical movement of the carriage 21. With the carriage 21 in this second ejection position (FIG. 7) the smaller slice 15 can be easily retrieved. It will be seen that the maximum dimension by which the carriage 21 may be raised above the actuating member 30 is the dimension x.

Figure 6:
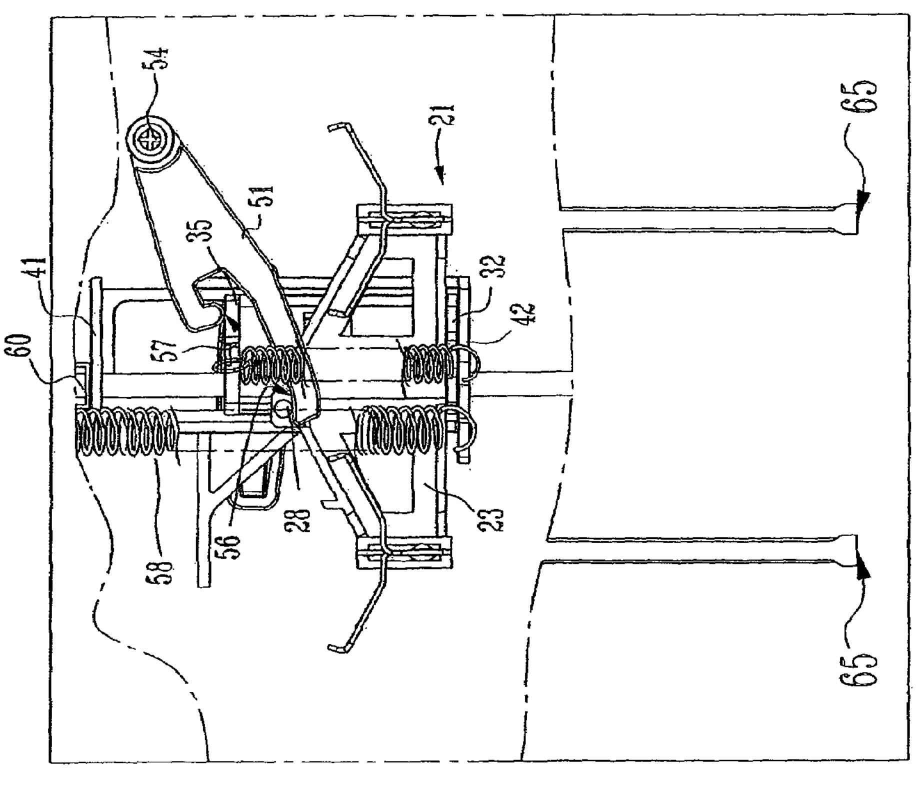
FIG. 6 is a partially cut away elevation of the mechanism with the carriage in a first ejection position.

When the handle 16 is then released from its uppermost position it drops, together with the carriage 21, restoring the carriage 21 and actuating member 30 to the positions shown in FIG. 6.

Aspects of the present invention have been described by way of example only. It should be appreciated that this and other modifications and additions may be made to the invention without departing from the scope thereof.

The invention claimed is:

1. An electric toaster comprising:

a housing with an elongate top opening for insertion of an item to be toasted;

an upright slot in the housing;

an upright rail in the housing;

a carriage in the housing for supporting an item to be toasted, the carriage being engaged with the rail for movement along the rail between a toasting position, a first ejection position, and a second ejection position, higher than the first ejection position;

a support member movably engaged with the rail;

an actuating member engaged with the rail and movable relative to the support member and the carriage, the actuating member having an operating arm extending through the upright slot;

a displacement-amplifying mechanism mounted on the support member and operatively connecting the actuating member to the carriage;

a hold-down latch;

a latching member cooperating with the hold-down latch; and first resilient means for urging the carriage to the first ejection position, wherein the carriage, the support member, and the actuating member abut one another and move simultaneously when the operating arm is moved downwards towards the toasting position so the latching member engages the hold-down latch, the carriage, the support member, and the actuating member abut one another and move together when the hold-down latch is released and the carriage is moved upwards by the first resilient means to the first ejection position, and, with the carriage in the first ejection position, movement of the actuating member upwardly relative to the support member is amplified by the displacement-amplifying mechanism in moving the carriage from the first ejection position to the second ejection position.

2. The electric toaster of claim 1 wherein the displacement-amplifying mechanism comprises a lever mounted on a pivot on the support member, the lever having first and second abutment faces spaced radially from the pivot at first and second distances, respectively, the first distance exceeds the second distance, the carriage has a first abutment, the actuating member has a second abutment so that, with the carriage in the first ejection position, movement of the actuating member upwardly relative to the support member engages the first and second abutment faces with the first and second abutments, respectively, raising the carriage to the second ejection position.

3. The electric toaster of claim 1 further including:

heating elements, a normally-open switch electrically connected to the heating elements, wherein the switch is located for engagement with the actuating member or the support member to close the switch, and with the actuating member and the support member lowered to an intermediate position in which the carriage reaches the toasting position, the switch is open, and further downward movement of the actuating member below the intermediate position is necessary to close the switch.

4. The electric toaster of claim 2 wherein the lever is bifurcated and has first and second legs on which the first and second abutment faces are disposed, and the first and second legs are fixed to a hub portion for receiving the pivot.

5. The electric toaster of claim 2 wherein the pivot has an axis that is substantially perpendicular to an axis of the rail.

6. The electric toaster of claim 1 wherein the support member and the actuating member each have respective upper and lower flanges joined by a web, the rail is received in aligned apertures in the upper and lower flanges of the support member, the upper and lower flanges of the actuating member are located between the upper and lower flanges of the support member, and the carriage includes a bracket portion having an opening in which the rail is received, the bracket portion being located between the upper and lower flanges of the actuating member.

7. The electric toaster of claim 6 wherein the web of the support member includes an aperture through which the operating arm extends.

8. The electric toaster of claim 6 wherein the first resilient means comprises a first spring, and the electric toaster further comprises a chassis to which the rail is mounted, and a second spring connected between the lower flange of the support member and the upper flange of the actuating member, and the first spring is connected between the chassis and the lower flange of the support member.

* * * * *